March 13, 1934.   W. D. WILCOX   1,951,044
PROCESS OF DISSOCIATING HYDROCARBON GASES AND VAPORS TO OBTAIN A MIXTURE
OF HYDROGEN AND NITROGEN IN DETERMINED PROPORTIONS
Filed July 7, 1930
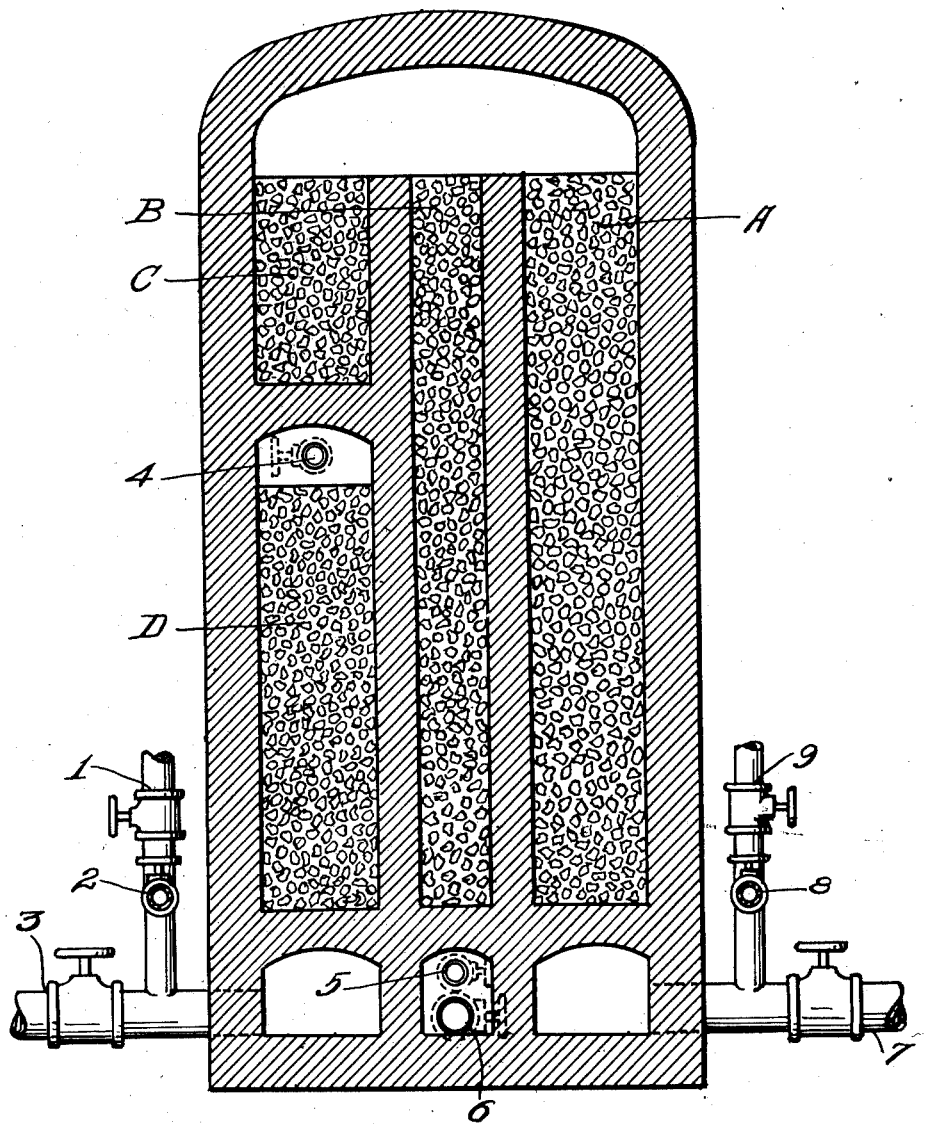
INVENTOR.
William D Wilcox Patented Mar. 13, 1934

1,951,044

UNITED STATES PATENT OFFICE 1,951,044

PROCESS OF DISSOCIATING HYDROCARBON GASES AND VAPORS TO OBTAIN A MIXTURE OF HYDROGEN AND NITROGEN IN DETERMINED PROPORTIONS

William D. Wilcox, Lawrence, Kans.

Application July 7, 1930, Serial No. 466,354

13 Claims. (Cl. 23—7)

In my pending application #306,578 I disclose a procedure in which the interior of a conduit preferably of substantial cross section and enclosing either a body of checker brick or a multiplicity of refractory walled flues to serve as the media of heat absorbtion and transfer, is brought to a temperature substantially in excess of 2000° F. by maintaining an active combustion therein and following this a mixture of hydrocarbon gases, steam, and air so proportioned that the volume of nitrogen admitted in the air will be in the desired ratio to the volume of hydrogen in the resultant final product, is introduced into the conduit and caused to pass through it in a direction reverse to the direction of travel of the combustion gases through the conduit in the preceding cycle, so that the mixture of gases is progressively brought into contact with more highly heated surfaces and is brought in contact prior to withdrawal with the most highly heated surfaces within the conduit. In this travel and as a result of the heat imparted to the gaseous mixture the following reaction occur. Methane, for simplicity of illustration, is assumed to be the hydrocarbon subjected to treatment:

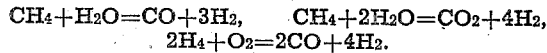

$$CH_4+H_2O=CO+3H_2, \quad CH_4+2H_2O=CO_2+4H_2,$$
$$2H_4+O_2=2CO+4H_2.$$

Steam in excess is then added to the gas, reducing the temperature to around 900° F. and it is passed through a chamber in contact with a catalyst which promotes the reaction $CO+H_2O=CO_2+H_2$, and the $CO_2$ being absorbed out by well known means, there remains a mixture of hydrogen and nitrogen in the proportions desired, which ordinarily will be those of 3 to 1 in which they unite to form ammonia. In such synthesis, it is important that there be no admixture of undecomposed hydrocarbons. The hydrocarbons must be decomposed with substantial completeness.

I find that when passing through the conduit, the gaseous mixture has attained a temperature at which the oxygen in the air unites with the hydrocarbons, a rise in temperature results from the partial combustion, which in some degree checks absorbtion of heat by the gases from the adjacent surfaces. I find also that it is exceedingly difficult to attain a temperature by contact with heated surfaces at which dissociation of the hydrocarbons can be made complete at a satisfactory rate of throughput, and more difficult still to maintain this high temperature during a dissociation period of substantial length. The reactions which occur are as a whole endothermic or heat absorbing and the heat rendered latent in addition to that required to bring the gaseous mixture to the temperature at which dissociation occurs and at which the gas is withdrawn quickly reduces the temperature of the adjacent surfaces, and unless the cycle is at once ended and the conduit reheated, a considerable portion of the hydrocarbons will remain undecomposed. I find that at temperatures at which, equilibrium relations being established, the dissociation of the hydrocarbons would be complete, there remains a substantial proportion of undecomposed hydrocarbons, unless an entirely impracticable period of time has been allowed within which the reactions may take place.

There is a very substantial advantage secured by bringing the gases to a temperature limited only by the ability to find refractories which will resist the high temperature of operation.

In my improved process which is here described I employ a conduit filled with loosely piled refractory bodies, checker brick or refractory walled flues. In order to make my procedure more clearly understood I am filing a drawing with this specification. This drawing shows apparatus which may be used in carrying out my process. It need not be in the precise form shown. I do not limit myself to the particular form so long as the essential steps of the process can be carried out. The conduit may even be heated by means of active combustion maintained continuously in adjacent flues, though this method of heating presents difficulties. There is shown in the drawing a vertical cross section of a refractory walled chamber separated, except at its upper extremity, by a dividing wall into two chambers, AB and CD, and filled for the most part with fragments of refractory material supported by arches. Checker brick or flues may as already stated be alternatively employed to permit the absorption and transfer of heat. It is heated to a dissociating temperature by admitting air under some pressure through inlet 1 and fuel gas through inlet 4. These are ignited and an active combustion maintained within C and AB until a temperature substantially in excess of 2000° F. has been imparted to the enclosed refractory bodies. In the particular apparatus shown, part of the combustion gases after passing through C pass down B and are discharged through outlet 6, part pass down through A and are discharged through outlet 9. Following the heating cycle, the air and gas are shut off, steam is admitted through inlet 2 to purge the combustion gases from the chamber, 8 and 9 are closed, outlet 3 is opened. A mixture of hydrocarbon gases and steam are admitted to the base of A and a volume of air so controlled with respect to the volume of hydrocarbon gases passing up through A as to yield the desired proportion of nitrogen is passed up through B. A considerable dissociation occurs in the passage of the hydrocarbon gas-steam mixture up through A, according to the general equation $CH_4+H_2O+heat=CO+3H_2$. The mixture is also brought to a temperature of perhaps 2000° F. by the time it has reached the upper extremity of A. The air passing up through B is highly preheated. When the air and gas unite in the open space above A and B there is a partial combustion which takes place for the most part while the mixture is passing through the highly preheated section C in contact with surfaces heated to the maximum temperature attained in the preheating cycle. There is a substantial rise in the temperature as a result of this partial combustion which greatly increases the maximum temperature finally attained and promotes both rapid and a complete dissociation. The mixture of very hot gas then passes prior to discharge in contact with the refractory surfaces in D. D functions as a regenerator, serving to preheat the air which is admitted through inlet 1 during the reheating cycle of operation prior to its union with the fuel gas which is admitted through 4. The gases passing out through 3 will be cooled by adding to them an excess volume of steam admitted through 2, so that they are in a condition favorable both as regards temperature and the proportion of steam to carbon monoxide to the conversion of the CO to $CO_2$ as a part of the final step of removing oxides of carbon from the gas. The air added to the hydrocarbon gases need not be heated in the way shown but may be preheated by independent means prior to admixture with the gases resulting from pyrolysis of the steam-hydrocarbon mixture. I preferably pass this steam-hydrocarbon gas mixture through the heated conduit counter current to the travel of the combustion gases during the preheating cycle. Preferably more steam is added to the hydrocarbon gases than will be sufficient when dissociated to oxidize to carbon monoxide the carbon of the hydrocarbons so that there will be some excess of undecomposed steam in the gas prior to the addition of steam at the outlet through 2. The rate of travel and time of subjection to dissociating conditions in the conduit will be so controlled as to bring about a dissociation of the hydrocarbons such that the oxygen admitted later in the air is more than sufficient to oxidize to CO the carbon remaining in the undecomposed hydrocarbons. The air will be preferably preheated to a temperature of 1800° F. or more, considerably in excess of the temperature at which ignition results. At temperatures above 1800° F. oxygen tends to unite with carbon to form carbon monoxide rather than with hydrogen to form $H_2O$, but there being some excess of oxygen in the air there will be some hydrogen burned after all the carbon present in the undecomposed hydrocarbons has been oxidized to CO. The burning of this hydrogen effects a material rise in the temperature of the gaseous mixture.

To illustrate what will take place, assuming for simplicity that the hydrocarbon gas treated is a pure methane, $10CH_4+12H_2O+heat=2CH_4+24H_2+4H_2O+8CO$, this is the initial reaction. 14.3 vols of air $(3O_2+11.3N_2)$ are now added. $2CH_4+24H_2+4H_2O+8CO+3O_2+11.3N_2=24H_2+10CO+8H_2O+11.3N_2$. Conversion of 10CO by union with steam according to the equation $10CO+10H_2O=10CO_2+10H_2$ will yield in theory a final volume of $34H_2$ and $11.3N_2$. There is some drop in the hydrogen volume through loss by absorption and lack of absolute completeness in the conversion of CO to $CO_2$, but provision can be made for this as well as to offset the nitrogen present in the hydrocarbons treated or introduced through incomplete purging so as to attain very closely the proportions required.

The chief gain realized in the modified procedure here described results from the increase in the amount of heat which can be absorbed from the adjacent surfaces by the steam-hydrocarbon mixture where the temperature is not raised as a result of partial combustion due to the presence of air when the temperature of ignition is attained and from the very substantial increase in the final temperature attained when by the addition of preheated air to a gaseous mixture already brought nearly to the maximum temperature attainable by contact with heated surfaces, a combustion not only of all unoxidized carbon takes place but of some proportion of the hydrogen. A final temperature of 2800° to 3000° F. is possible to attain.

What I claim as new and desire to protect by the issuance to me of Letters Patent is—

1. The improvement in the process of dissociating hydrocarbon gases and vapors to obtain a mixture of hydrogen and nitrogen in determined proportions, which comprises heating the interior of a refractory walled conduit to a dissociating temperature by maintaining an active combustion therein, thereafter passing a mixture of hydrocarbon gases and steam through the conduit, simultaneously bringing a volume of air to a high temperature and uniting it with the gas-steam mixture at an intermediate point in the travel of the gas through the preheated conduit, at a rate of addition such as provides the desired proportion of nitrogen and thereafter removing the oxides of carbon from the gas.

2. The steps in the process of obtaining a mixture of hydrogen and nitrogen in determined proportions by the dissociation of hydrocarbon gases and vapors, which comprises heating the interior of a conduit having a permeable filling of refractory material to a dissociating temperature by a precedent combustion therein, then passing through the conduit in a direction counter current to the flow of the combustion gases, a mixture of hydrocarbon gases with steam in a volume somewhat in excess of that sufficient if dissociated to supply oxygen to oxidize the carbon of the hydrocarbon gases to carbon monoxide, effecting a partial dissociation, simultaneously bringing a volume of air to a high temperature and uniting it with the steam-gas mixture at an intermediate point within the prior heated conduit, in such relative volume as will provide the desired proportion of nitrogen.

3. The steps in the process of obtaining a mixture of hydrogen and nitrogen in determined proportions, which comprises effecting a partial dissociation of a mixture of hydrocarbon gases and steam by its passage through a conduit having a permeable filling of refractory material brought to a dissociating temperature by a precedent combustion within the conduit, simultaneously preheating a controlled volume of air in a separate prior heated division of the conduit and bring the gas-steam mixture and the air together in a prior heated section of the conduit where an increase in the temperature is secured by reason of a partial combustion.

4. The steps in the process of obtaining a mixture of hydrogen and nitrogen in controlled proportions by the dissociation of hydrocarbon gases and vapors, which comprises heating a conduit filled with a body of refractory material, and divided for a portion of its length into two divisions, to a dissociating temperature by a precedent combustion within the conduit, then passing a mixture of hydrocarbon gases and steam through one division of the conduit, a controlled volume of air through the other division of the conduit, thereafter bringing the gas, steam and air together within a prior heated section of the conduit and effecting a substantial increase of the temperature of the mixture through the resulting partial combustion.

5. The improvement in the process of obtaining a mixture of hydrogen and nitrogen in determined proportions by the dissociation of hydrocarbon gases, which consists in heating the interior of a refractory walled conduit to a dissociating temperature by a precedent internal combustion, then passing a mixture of hydrocarbon gases and steam through the conduit in a direction counter current to the travel of the heating gases, simultaneously preheating a controlled volume of air and uniting it with the gas-steam mixture at an intermediate point within the preheated conduit, whereby the temperature is increased by reason of a partial combustion and the desired proportion of nitrogen is added to the gas.

6. The improvement in the process of obtaining a mixture of hydrogen and nitrogen in determined proportions by the dissociation of hydrocarbon gases and vapors, which comprises heating the interior of a refractory walled conduit to a dissociating temperature by maintaining an active combustion therein, then passing a mixture of hydrocarbon gas and steam through the conduit in a direction counter current to the travel of the combustion gas, simultaneously heating a volume of air to a temperature in excess of the ignition temperature of the gas and adding it to the hydrocarbon-steam mixture at an intermediate point in the travel of the gas through the preheated conduit, thence conveying the gaseous mixture through a regenerator chamber and in the subsequent reheating cycle utilizing the heat stored in the regenerator to preheat the air which supports combustion during the reheating cycle of operation.

7. The steps in the process of obtaining a mixture of hydrogen and nitrogen in determined proportions by the dissociation of hydrocarbon gases and vapors, which comprises heating the interior of a conduit having a permeable filling of refractory material to a temperature in excess of 2000° F. by maintaining an active combustion therein, then passing a mixture of hydrocarbon gases and steam through the conduit in a direction counter current to the travel of the combustion gases at a rate so controlled as to secure a controlled degree of dissociation, simultaneously heating to a high temperature and adding it to the gas-steam mixture at an intermediate point in its travel through the heated conduit at a rate relative to the volume of hydrocarbon gas as will provide the desired proportion of nitrogen in the final product, and a volume of oxygen ample to oxidize to carbon monoxide any carbon in the hydrocarbon gas remaining undecomposed.

8. The process of obtaining a mixture of hydrogen and nitrogen in determined proportions, carried out in a refractory walled conduit, the interior surfaces of which have been brought to a dissociating temperature, which consists in passing a mixture of hydrocarbon gases and steam through the conduit in a direction counter current to the travel of the heating gases at a controlled rate of through-put, simultaneously bringing a volume of air to a high temperature and uniting it with the gas-steam mixture at an intermediate point in the travel of the mixture through the conduit at a rate of addition which will provide oxygen ample to oxidize the carbon of any undecomposed hydrocarbons to carbon monoxide and nitrogen in the volume desired in the final product, thence passing the gases through a regenerator chamber, adding steam in excess to further cool the gas, converting the carbon monoxide to carbon dioxide and absorbing out the carbon dioxide.

9. The steps in the process in obtaining a mixture of hydrogen and nitrogen in determined proportions by the dissociation of hydrocarbon gases and vapors, which comprises heating the interior of a conduit having a filling of refractory material to a dissociating temperature by means of a precedent combustion within the conduit, then passing through the conduit a mixture of hydrocarbon gases and steam in a direction counter current to the travel of the combustion gases, simultaneously adding to the gas-steam mixture at an intermediate point in its travel through the conduit a volume of highly preheated air in a volume sufficient to supply the desired proportion of nitrogen, and oxygen more than sufficient to oxidize to carbon monoxide any carbon remaining unoxidized in the gaseous mixture at the point of addition, so controlling the rate of throughput as to control the degree of dissociation of the hydrocarbon gases prior to the introduction of air.

10. The process of obtaining a mixture of hydrogen and nitrogen in determined proportions by the dissociation of hydrocarbon gases and vapors, which comprises heating the interior of a conduit having a filling of refractory bodies to a temperature substantially in excess of 2000° F. by maintaining an active combustion within the conduit, then passing a mixture of hydrocarbon gases and steam in controlled proportions through the conduit in a direction counter current to the travel of the combustion gases, simultaneously introducing a volume of highly preheated air into the gas-steam mixture at an intermediate point in its travel through the preheated conduit, passing the mixture through a further highly preheated section of the conduit, whereby a complete dissociation of the hydrocarbon gases is brought about, then cooling the gas by the addition of steam to a temperature around 900° F., converting the carbon monoxide content to carbon dioxide and removing the carbon dioxide from the gas.

11. The steps in the process of obtaining a mixture of hydrogen and nitrogen in determined proportions by the dissociation of hydrocarbon gases and vapors, which comprises heating the interior of a conduit having a filling of refractory material to a dissociating temperature by maintaining an active combustion therein, then passing a mixture of hydrocarbon gases with steam in a volume more than sufficient if decomposed to provide oxygen to oxidize the carbon of the hydrocarbons to monoxide through the conduit in a direction counter current to the travel of the combustion gases, simultaneously adding to the gas-steam mixture at an intermediate point in its travel through the conduit, a volume of air sufficient to supply the desired proportion of nitrogen in the final product, and oxygen sufficient to oxidize to carbon monoxide any carbon not already so oxidized by the oxygen derived from the steam, and some portion of the hydrogen to water vapor, passing the gas through a further preheated section of the conduit and thence through a regenerator chamber prior to its withdrawal.

12. The process of obtaining a mixture of hydrogen and nitrogen in determined proportions by the dissociation of hydrocarbon gases and vapors, which comprises passing a mixture of hydrocarbon gases and steam in controlled proportions and at a controlled rate through the interior of a refractory walled conduit which has been brought to a temperature in excess of 2000° F., simultaneously admitting highly preheated air to the interior of the conduit at an intermediate point in the travel of the gas-steam mixture through the conduit in a volume so controlled as to provide the proportion of nitrogen desired in the final product, together with oxygen sufficient to increase substantially by a partial combustion the temperature of the gas, and oxidize to carbon monoxide any carbon remaining in union with hydrogen, passing the gas through a further preheated section of the conduit, cooling the gas by the addition of steam and removing the oxides of carbon from the gas.

13. The steps in the process of obtaining a mixture of hydrogen and nitrogen in determined proportions by the dissociation of hydrocarbon gases and vapors, which comprises heating the interior of a refractory walled conduit to a temperature in excess of 2000° F., then passing through the conduit a mixture of hydrocarbon gases and steam; controlling the rate of travel so as to secure a determined degree of dissociation by the time the gas has reached an intermediate point in its travel through the conduit, thereupon adding to the gas a controlled proportion of preheated air such as will provide the desired proportion of nitrogen in the final product, and so much oxygen as will by the resultant combustion bring the gas to a temperature at which the dissociation of the hydrocarbon gases will be substantially completed; thereafter passing the decomposed product through a regenerator chamber and employing the heat imparted thereto in preheating the air used to support the heating of the conduit.

WILLIAM D. WILCOX.